US010586470B2

(12) United States Patent
Parry et al.

(10) Patent No.: US 10,586,470 B2
(45) Date of Patent: *Mar. 10, 2020

(54) WOUND BOX TRAINER

(71) Applicant: Techline Technologies, Inc., Willow Grove, PA (US)

(72) Inventors: Daniel J. Parry, Perkasie, PA (US); Jonathan A. Closeme, Lansdale, PA (US); David J. Parry, Jr., Yardley, PA (US); Anthony R. Grillo, Coatesville, PA (US)

(73) Assignee: Techline Technologies, Inc., Willow Grove, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,202

(22) Filed: Jun. 3, 2019

(65) Prior Publication Data

US 2019/0287422 A1    Sep. 19, 2019

Related U.S. Application Data

(63) Continuation of application No. 16/244,735, filed on Jan. 10, 2019, which is a continuation-in-part of application No. 15/144,007, filed on May 2, 2016, now Pat. No. 10,217,380, which is a continuation-in-part of application No. 15/045,295, filed on Feb. 17, 2016, now Pat. No. 10,115,322, which is a continuation-in-part of application No.
(Continued)

(51) Int. Cl.
*G09B 23/30* (2006.01)

(52) U.S. Cl.
CPC .................. *G09B 23/303* (2013.01)

(58) Field of Classification Search
USPC ................ 434/262, 265, 267, 268, 272, 274
See application file for complete search history.

(56) References Cited

U.S. PATENT DOCUMENTS

| 3,027,655 A | * | 4/1962 | Alderson | ............... G09B 23/32 434/268 |
| 3,852,893 A | * | 12/1974 | Smrcka | .................. G09B 23/32 434/268 |

(Continued)

*Primary Examiner* — Kurt Fernstrom
(74) *Attorney, Agent, or Firm* — Michael Crilly, Esquire

(57) ABSTRACT

A training device applicable to training personnel in the treatment of a traumatic injury is presented. The invention includes a compressible body, a base, a wound structure, and an annular cavity. The compressible body simulates a body portion. The compressible body resides within the base. The base is disposed about a top surface of the compressible body. The base is harder than the compressible body so that the base protectively covers the compressible body. The wound structure is disposed along the compressible body. The wound structure includes a wound cavity which extends from the top surface into the compressible body. The annular cavity extends into the compressible body about the wound cavity. The annular cavity permits movement and/or expansion of a wall defined by and between the wound cavity and the annular cavity when probed by a finger or instrument and packed with gauze, bandages, and the like during treatment of the wound structure to stem blood flow from a bleed tube.

20 Claims, 8 Drawing Sheets

Related U.S. Application Data

13/925,949, filed on Jun. 25, 2013, now Pat. No. 9,280,917, which is a continuation-in-part of application No. 13/532,848, filed on Jun. 26, 2012, now Pat. No. 8,491,309, which is a continuation-in-part of application No. 12/131,980, filed on Jun. 3, 2008, now Pat. No. 8,221,129.

(60) Provisional application No. 61/681,856, filed on Aug. 10, 2012.

(56) References Cited

U.S. PATENT DOCUMENTS

| | | | | |
|---|---|---|---|---|
| 6,241,525 | B1 * | 6/2001 | Spitalnik | G09B 23/28 434/262 |
| 7,850,454 | B2 * | 12/2010 | Toly | G09B 23/28 434/262 |
| 7,887,330 | B2 * | 2/2011 | King | G09B 23/28 434/268 |
| 8,221,129 | B2 * | 7/2012 | Parry | G09B 23/30 434/272 |
| 8,491,309 | B2 * | 7/2013 | Parry | G09B 23/30 434/272 |
| 8,840,403 | B2 * | 9/2014 | Segall | G09B 23/28 434/272 |
| 9,916,774 | B2 * | 3/2018 | Segall | G09B 23/28 |
| 2009/0011394 | A1 * | 1/2009 | Meglan | G09B 23/28 434/268 |
| 2010/0196865 | A1 * | 8/2010 | Kays | G09B 23/32 434/268 |
| 2013/0224712 | A1 * | 8/2013 | Day | G09B 23/303 434/268 |
| 2013/0274688 | A1 * | 10/2013 | Weston | A61F 5/048 604/290 |
| 2016/0171911 | A1 * | 6/2016 | Parry, Jr. | G09B 23/30 434/268 |
| 2016/0300509 | A1 * | 10/2016 | Spotnitz | G09B 23/28 |
| 2017/0053563 | A1 * | 2/2017 | Holloway | G09B 23/28 |
| 2017/0193858 | A1 * | 7/2017 | Segall | G09B 23/303 |
| 2017/0345339 | A1 * | 11/2017 | Normand | G09B 23/28 |

* cited by examiner

WOUND BOX TRAINER

CROSS REFERENCE TO RELATED APPLICATIONS

This application is a continuation of co-pending U.S. Non-Provisional application Ser. No. 16/244,735 filed Jan. 10, 2019 entitled Wound Box Trainer which is a continuation-in-part of U.S. Non-Provisional application Ser. No. 15/144,007 filed May 2, 2016 entitled Wound Box Trainer now U.S. Pat. No. 10,217,380 which is a continuation-in-part of U.S. Non-Provisional application Ser. No. 15/045,295 filed Feb. 17, 2016 entitled Torso Simulant with Vascular Elements Mechanically Responsive to a Tourniquet now U.S. Pat. No. 10,115,322 which is a continuation-in-part of U.S. Non-Provisional application Ser. No. 13/925,949 filed Jun. 25, 2013 entitled Simulant with Vascular Structure Mechanically Responsive to a Tourniquet now U.S. Pat. No. 9,280,917 which claims priority to U.S. Provisional Application No. 61/681,856 filed Aug. 10, 2012 entitled Simulant with Vascular Structure Mechanically Responsive to a Tourniquet; furthermore U.S. Non-Provisional application Ser. No. 13/925,949 now U.S. Pat. No. 9,280,917 is a continuation-in-part of U.S. Non-Provisional application Ser. No. 13/532,848 filed Jun. 26, 2012 entitled Wearable Wound Simulant now U.S. Pat. No. 8,491,309 which is a continuation-in-part of U.S. Non-Provisional application Ser. No. 12/131,980 filed Jun. 3, 2008 entitled Wearable Wound Simulant now U.S. Pat. No. 8,221,129; all prior applications are hereby incorporated in their entirety by reference thereto.

FEDERALLY SPONSORED RESEARCH AND DEVELOPMENT

None.

BACKGROUND OF THE INVENTION

1. Field of the Invention

The invention generally relates to a device for medical training purposes. Specifically, the invention comprises a simulant disposed within a case whereby the simulant simulates a portion of a body, human or animal, with a wound structure including features permitting movement and expansion thereby when probed and packed.

2. Background

Mannequins and wearable simulants are commonly employed to train civilian and military personnel as to the proper treatment of penetrating and non-penetrating injuries. The purpose of such training is to instill the skills required to stabilize the medical condition of a patient before and during transport to a medical facility.

Mannequins and wearable simulants replicate the appearance and tactile properties of flesh, tissues, bones and organs, as well as penetrating and non-penetrating injuries thereto. Training devices often include tubes which allow a liquid simulating blood flow to and out of an injury. The combination of visual, tactile, and functional properties ensure a more realistic representation of an injury. However, mannequins and wearable simulants are costly and often include features and details that improve the overall realism of a training experience but otherwise not required for training purposes.

Some training devices are suited to a form which permits use within a container. For example, Niiranen et al. in U.S. Pat. No. 2,871,579 and Komlosi et al. in U.S. Pat. No. 5,873,863 separately describe a training simulant disposed within a box-like structure that functions as a readily convenient means for transporting and protecting the simulant and components related thereto after use.

The housings in Niiranen et al. and Komlosi et al. are problematic in that each box-like structure constrains movement and compression of the simulant when a wound cavity is probed by a finger or instrument or packed with gauze or other materials. The result is a simulant which does not adequately simulate compression of flesh, tissues, and organs disposed about a wound and resultant expansion of the wound cavity, thus impeding probing and packing of the wound and negating the value of the device as a training tool.

Accordingly, what is required is a training device including a simulant disposed within a carrying case whereby the case does not compromise movement and compression of the simulant immediately adjacent to a wound structure in response to probing and packing.

SUMMARY OF THE INVENTION

An object of the invention is a training device including a simulant disposed within a carrying case whereby the case does not compromise movement and compression of the simulant immediately adjacent to a wound structure in response to probing and packing.

In accordance with embodiments of the invention, the wound box trainer includes a compressible body, a base, a wound structure, and an annular cavity. The compressible body simulates a portion of a body. The compressible body resides within the base and includes a top surface whereby the base is disposed about the top surface. The base is harder than the compressible body so that the base protectively covers the compressible body without compromising the compressibility of the compressible body. The wound structure is disposed along the compressible body. The wound structure includes a wound cavity which extends from the top surface into the compressible body. The annular cavity extends into the compressible body about the wound cavity. The annular cavity permits movement or expansion of a wall defined by and disposed between the wound cavity and the annular cavity.

In accordance with other embodiments of the invention, the base is configured to accept the compressible body.

In accordance with other embodiments of the invention, the base is integral to the compressible body so as to form a unitary body.

In accordance with other embodiments of the invention, the wound box trainer further includes a lid attachable to the base so that the lid cooperates with the base to conceal the top surface.

In accordance with other embodiments of the invention, the compressible body includes a surface layer and a sub-surface layer.

In accordance with other embodiments of the invention, the surface layer is pigmented.

In accordance with other embodiments of the invention, the annular cavity and the wound cavity partially overlap.

In accordance with other embodiments of the invention, the wound structure includes a surface feature disposed about the wound cavity along the top surface whereby the surface feature simulates damage about the wound cavity.

In accordance with other embodiments of the invention, the annular cavity extends into the compressible body from a bottom surface.

In accordance with other embodiments of the invention, the wound box trainer further includes an insert disposed within the annular cavity adjacent to the bottom surface.

In accordance with other embodiments of the invention, a bleed tube communicates at one end with the wound cavity.

In accordance with other embodiments of the invention, a bleed tube is disposed within a channel along the unitary body.

In accordance with other embodiments of the invention, the wound structure simulates a penetration-induced wound.

In accordance with other embodiments of the invention, the wound structure simulates a blast-induced wound.

In accordance with other embodiments of the invention, the compressible body includes at least one runner which traverses a portion of the annular cavity.

In accordance with embodiments of a penetration-induced injury simulant, the simulant includes a compressible body and a wound structure.

In accordance with embodiments of a penetration-induced injury simulant, the simulant includes a compressible body, a wound structure, a blood simulant, and a packing material.

In accordance with embodiments of a penetration-induced injury simulant, the simulant includes a compressible body, a wound structure, a surface feature, and a blood simulant.

Several advantages are offered by the invention. The invention permits movement of the wall about a wound cavity when probed thereby simulating the movement of tissues, flesh, organs, and the like disposed about a wound. The invention permits expansion and contraction of the wall along a wound cavity thereby simulating the movement of tissues, flesh, organs, and the like disposed about a wound when the wound cavity expands and contracts. The invention permits a wound cavity to conform to gauze and other materials inserted into a wound for the purpose of stemming flow of a blood simulant from a vascular simulant.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Figure 1:
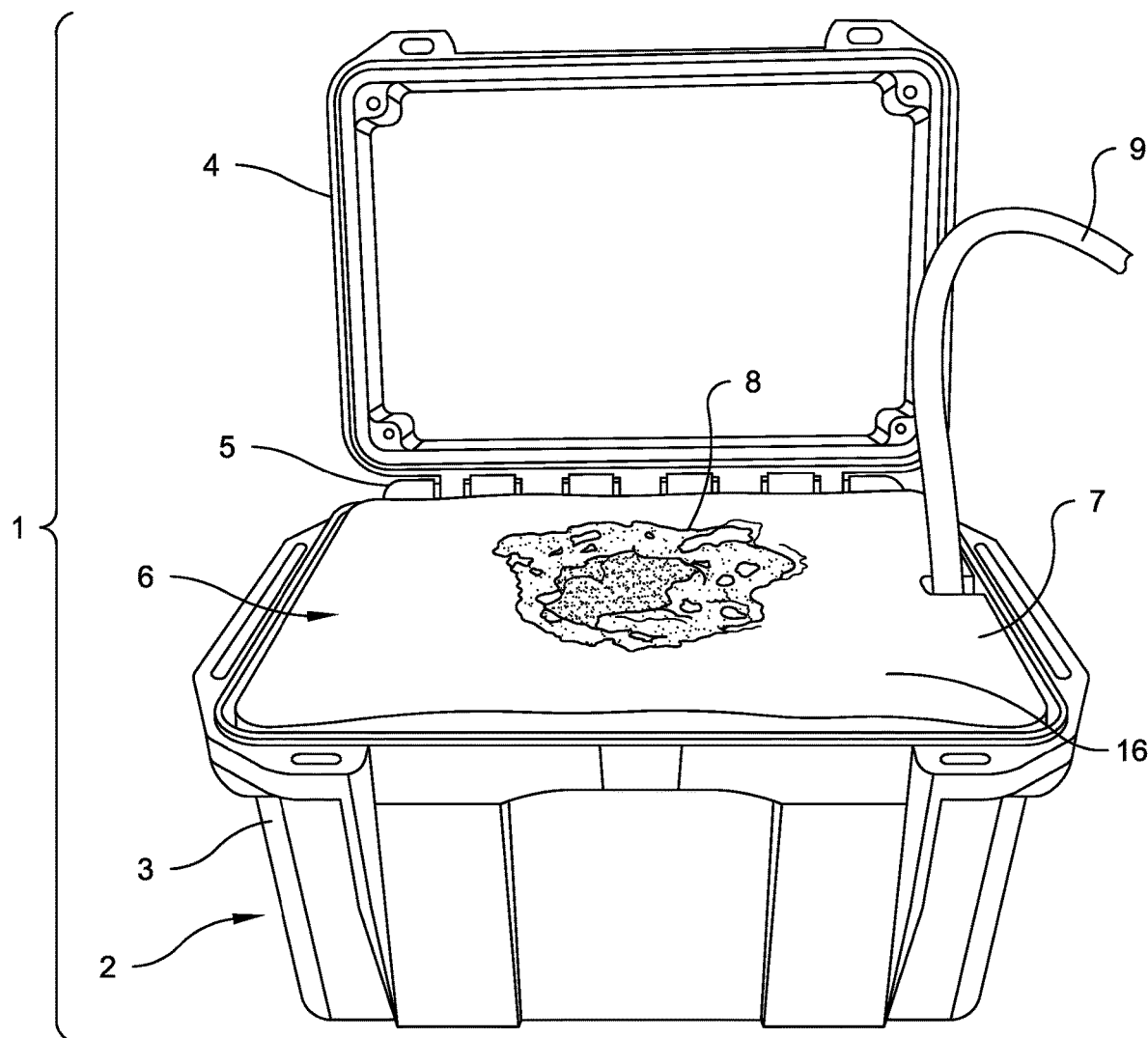
FIG. 1 is a front-side perspective view illustrating a wound box trainer including a simulant disposed within a base portion of a case with a closable lid attached thereto and a wound structure disposed along the simulant with an optional tube in accordance with an embodiment of the invention.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features could be combined into a single embodiment.

The simulants and tubes described herein may be fabricated via cast or other methods understood in the art.

Referring now to FIG. 1, the wound box trainer 1 generally includes a simulant 6 disposed within a case 2. The simulant 6 further includes a compressible body 7, a wound structure 8 disposed along the compressible body 7, and an optional bleed tube 9 extendable from the case 2.

Referring again to FIG. 1, the case 2 may further include a base 3 and a lid 4. The base 3 and lid 4 may be composed of materials suitable for a case 2, examples including, but not limited to, plastics and metals. The base 3 and lid 4 generally define a cavity of sufficient volume to hold and support the simulant 6. A hinge 5 may be attached to the base 3 and lid 4 so as to allow the lid 4 to be openable and closable with respect to the base 3. It is likewise possible for other connecting means understood in the art to allow the lid 4 to be attachable to and detachable from the base 3 so that the lid 4 is combinable with and separable from the base 3. Regardless of the means employed to open and close the case 2, the base 3 and the lid 4 should permit access to and use of the simulant 6 in an open configuration. The interface between base 3 and lid 4 may limit or prevent infiltration of a gas and/or a liquid into the case 2 in a closed configuration. Handle and locking mechanisms (not shown) may be included in some embodiments.

While it is understood that various designs are possible for the case 2, the purpose of the case 2 is to facilitate storage of a simulant 6 when not in use, transport of a simulant 6 to and from a training session, and use of a simulant 6 during a training session. The base 3 is harder and therefore less prone to damage than the compressible body 7. The base 3 with or without the lid 4 should protectively cover portions of the simulant 6 so as to prevent damage to and/or impairment of the simulant 6. The depth of the simulant 6 may allow the top surface 16 along the compressible body 7 to extend above, to reside below, or to align approximately with the top of the base 3, the latter being a preferred embodiment as illustrated in FIG. 1. One specific, non-limiting exemplary case 2 is the UltraBox™, model no. 406, sold by Underwater Kinetics located in Poway, Calif.

Figure 2:
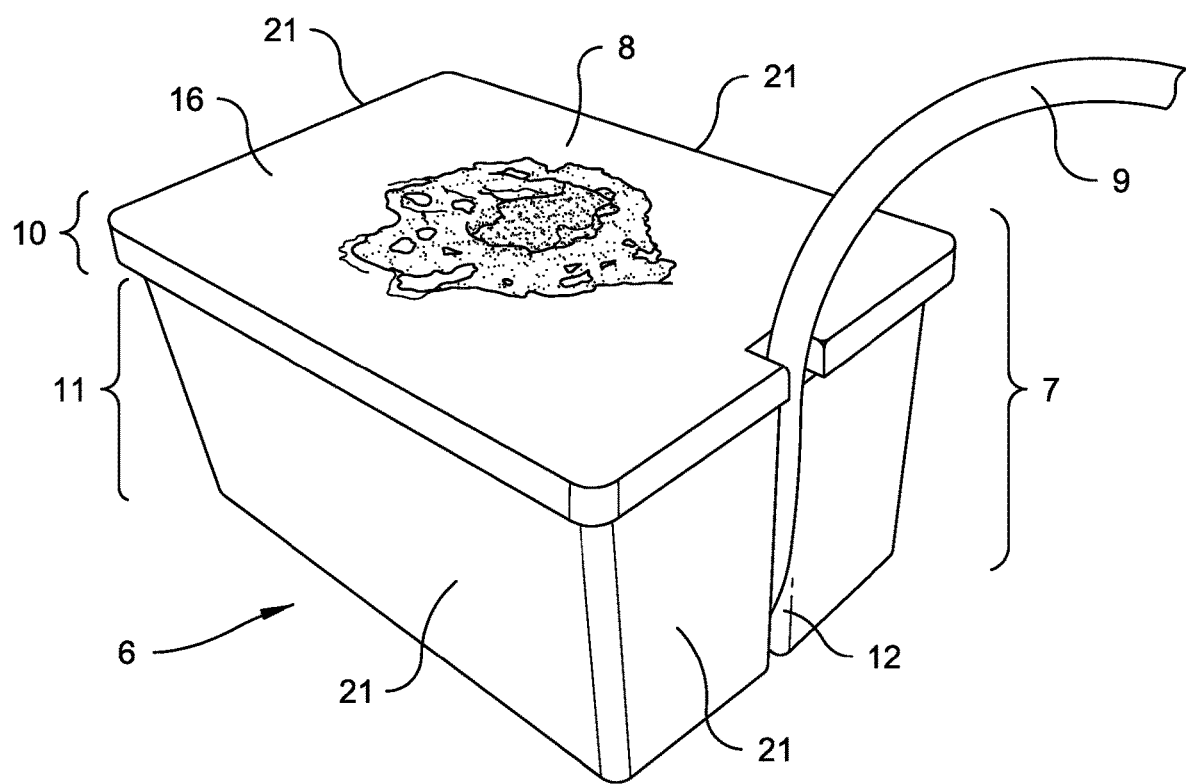
FIG. 2 is a top-side perspective view illustrating a simulant including a compressible body with a surface layer and a subsurface layer and a wound structure disposed along the simulant with an optional tube traversing a channel along the compressible body in accordance with an embodiment of the invention.
Figure 3:
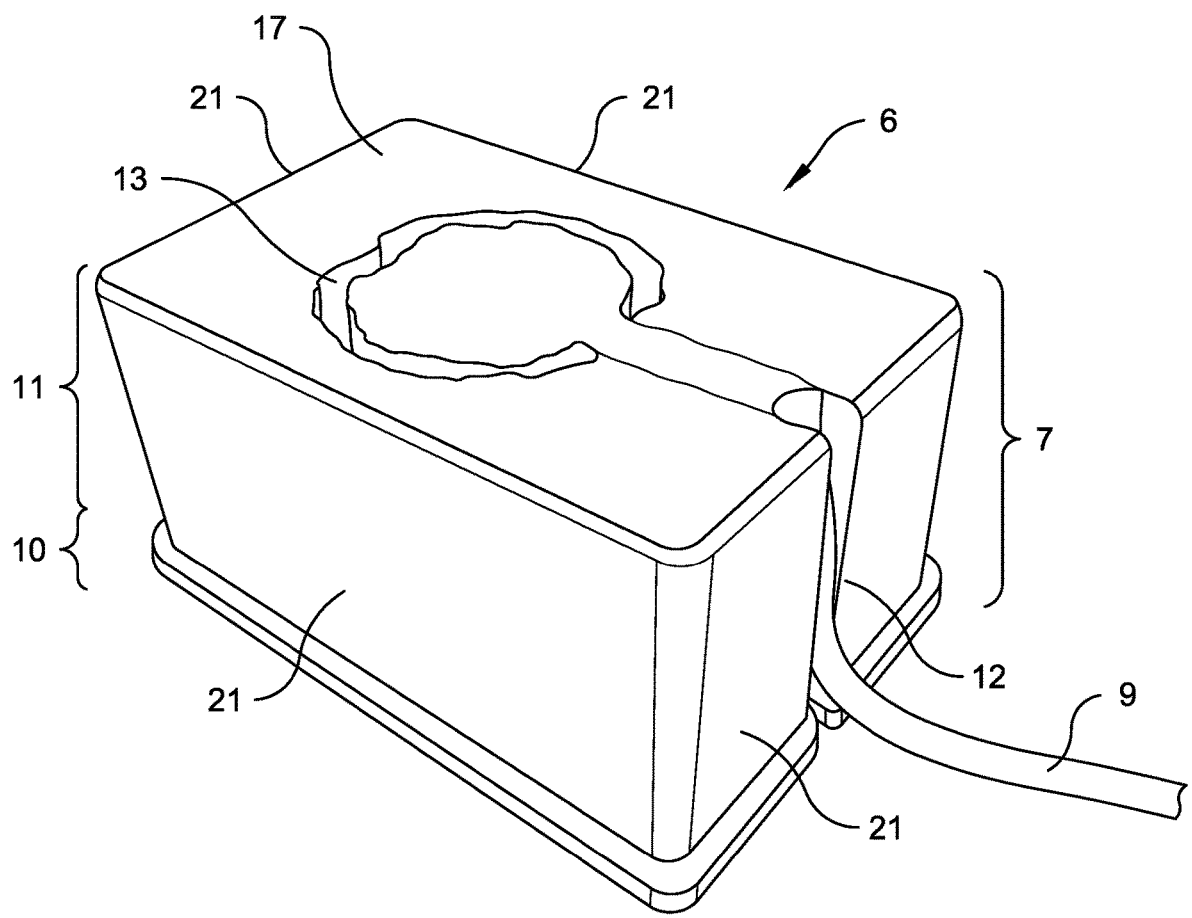
FIG. 3 is a bottom-side perspective view illustrating a simulant including a compressible body with an optional bleed tube traversing a channel along the side and the top of the compressible body and an annular channel extending into the compressible body in accordance with an embodiment of the invention.

Referring now to FIGS. 2 and 3, the simulant 6 is comprised of a compressible body 7 with a wound structure 8 thereon, preferably at the top surface 16. The compressible body 7 may be composed of one or more layers of one more polymer materials, one non-limiting example being silicone. The compressible body 7 should deform when a force is applied thereto, yet be sufficiently resilient to recover its original shape after the force is removed. In preferred embodiments, the compressible body 7 further includes a surface layer 10 and a subsurface layer 11. It is likewise possible for the surface layer 10 and the subsurface layer 11 to each be composed of one or more layers of one or more polymer materials. In one example, the surface layer 10 could include one or more layers with pigmentation, as described in U.S. Pat. No. 8,221,129 entitled Wearable Wound Simulant which is incorporated in its entirety by reference thereto, and the subsurface layer 11 could be a single cold-cast resin without pigmentation. In some embodiments, a bone simulant (not shown) or the like could be partially or complete embedded within the compressible body 7. The compressible body 7 is shaped and dimensioned to permit assembly into and with the base 3 whereby the sides 21 and the bottom surface 17 contact corresponding surfaces along the interior of the base 3.

Referring again to FIGS. 2 and 3, the compressible body 7 may include a channel 12 disposed along one side 21 and the bottom surface 17. The channel 12 may be formed via either cast or machining techniques. The channel 12 should be sufficiently wide and deep so that a bleed tube 9 is recessed within the compressible body 7 when the bleed tube 9 contacts the channel 12. An annular cavity 13 is either cast or machined into the compressible body 7 so as to extend into the compressible body 7 from the bottom surface 17.

Figure 4:
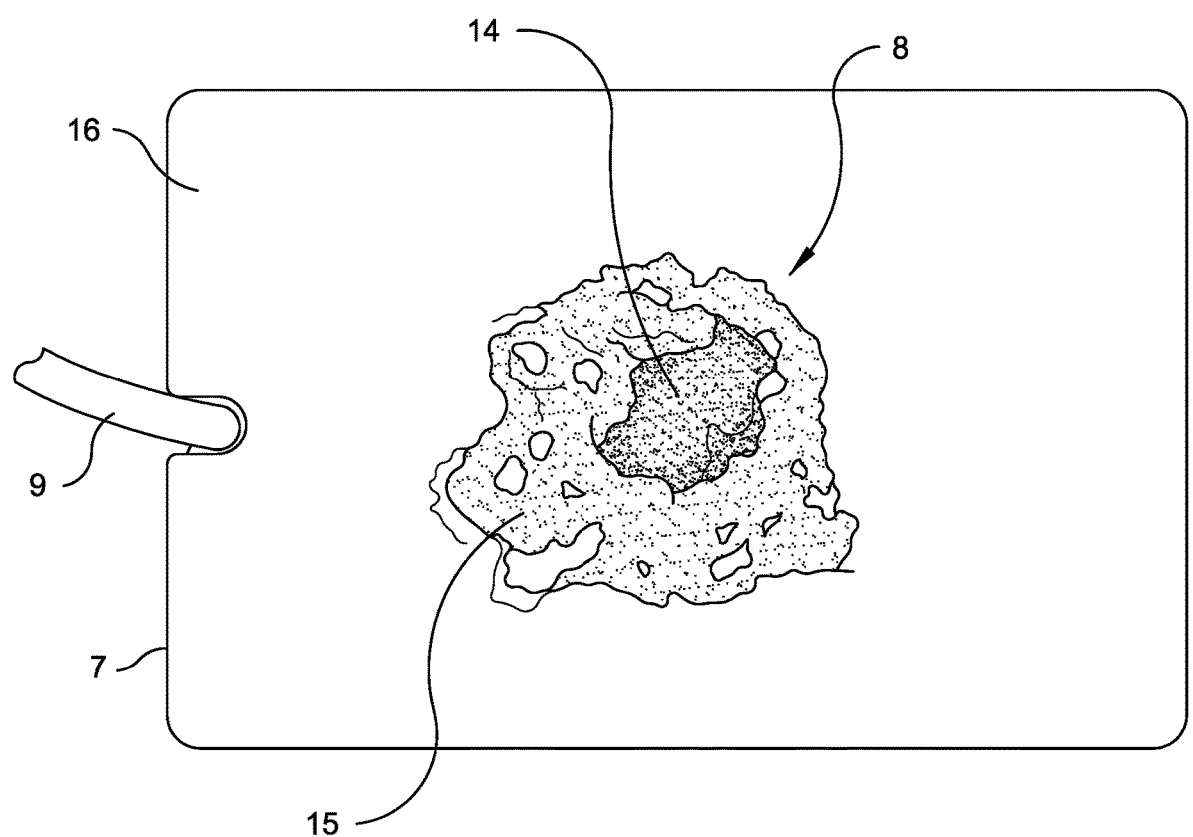
FIG. 4 is a top-side view illustrating a compressible body with a wound structure including a wound cavity extending into the compressible body and an optional surface feature about the cavity with an optional bleed tube at one side of the compressible body in accordance with an embodiment of the invention.
Figure 5:
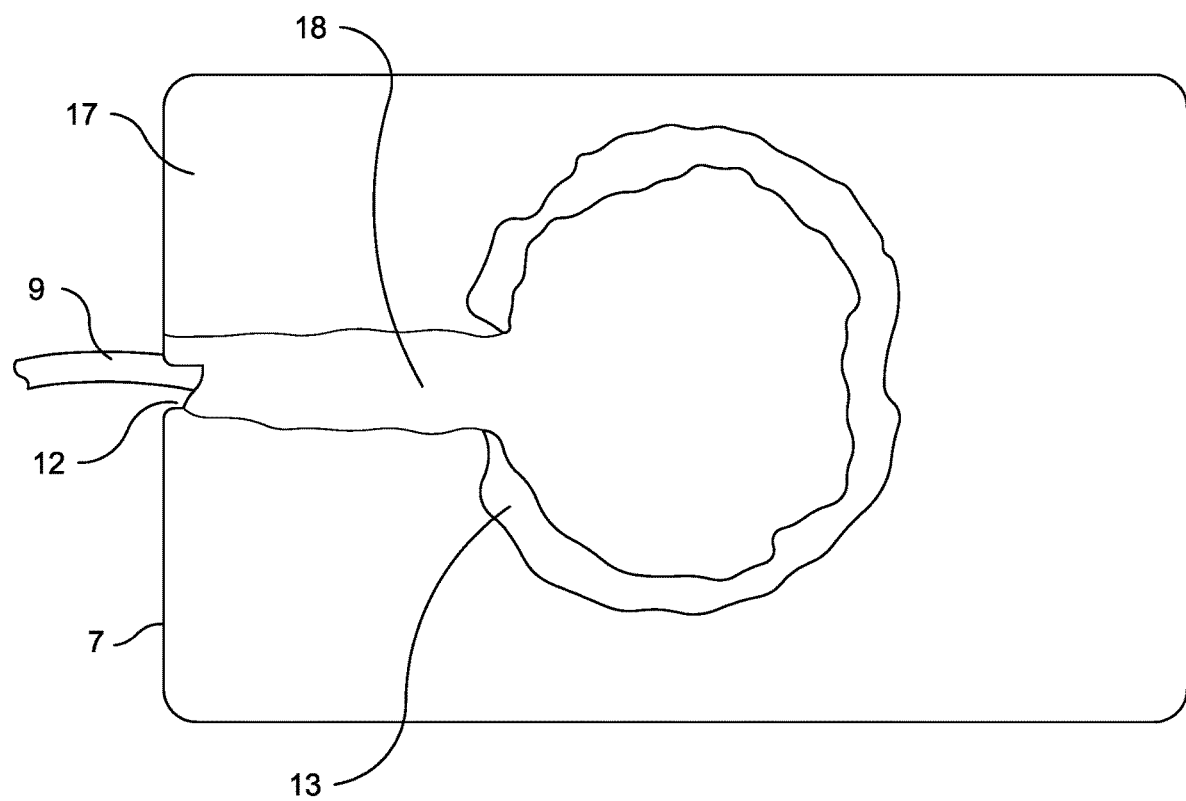
FIG. 5 is a bottom-side view illustrating an annular cavity extending into a compressible body about a wound cavity (not shown) and an optional bleed tube communicating with the wound cavity in accordance with an embodiment of the invention.

Referring now to FIGS. 4 and 5, a wound structure 8 and an annular cavity 13 are provided along the compressible body 7. The wound structure 8 further includes a wound cavity 14 that extends into the compressible body 7 from the top surface 16 in the direction of the bottom surface 17. In some embodiments, it might be advantageous to include a surface feature 15 disposed about the wound cavity 14. The surface feature 15 may include textures, coloring, and other features and elements that simulate damaged flesh, tissues, bones, and the like about a wound cavity 14. The annular cavity 13 extends from the bottom surface 17 into the compressible body 7 in the direction of the top surface 16. The annular cavity 13 is positioned circumferentially about the wound cavity 14.

Referring again to FIGS. 4 and 5, the bleed tube 9 may traverse a channel 12 along a portion of the bottom surface 17. One end of the bleed tube 9 communicates with the wound cavity 14. The bleed tube 9 may be secured to the compressible body 7 via an outer layer 18. The outer layer 18 may be composed of a layer of silicone adhesive or other cold curable resin.

Figure 6:
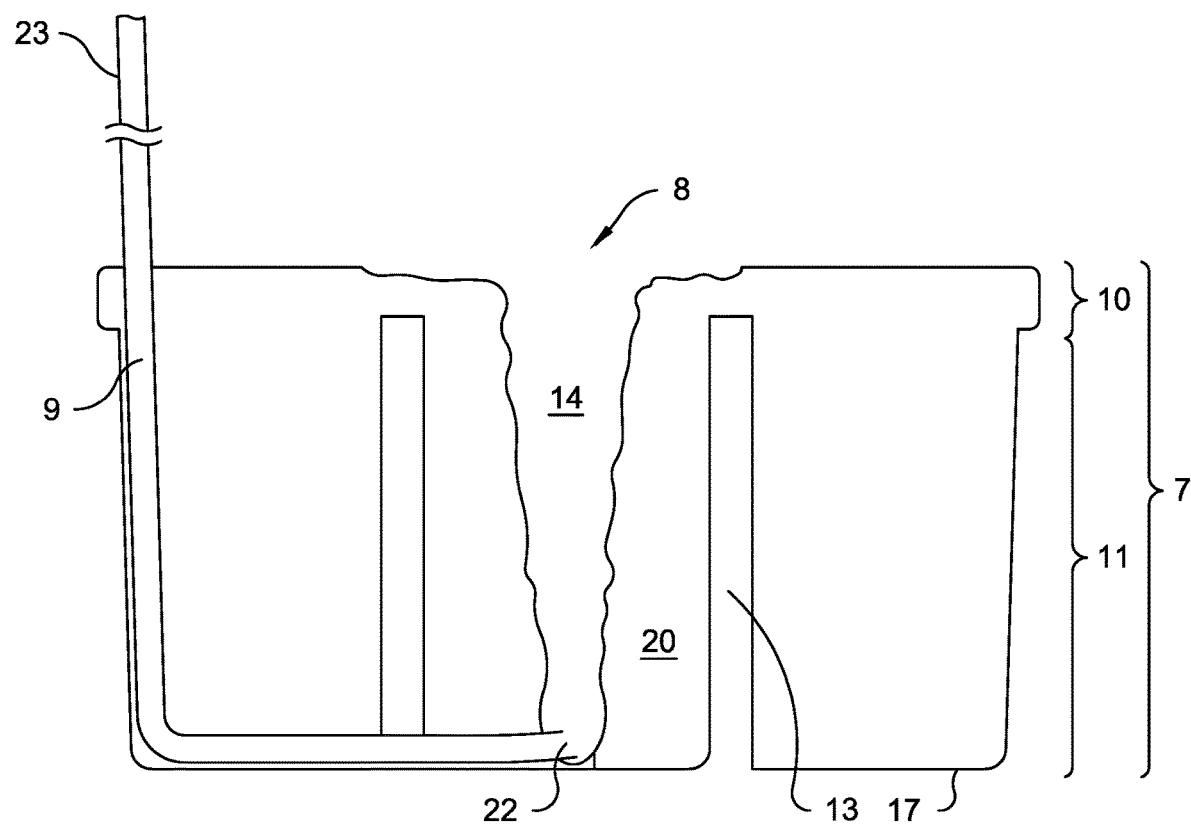
FIG. 6 is cross-section view illustrating a bleed tube disposed along a channel traversing the side and the bottom of a compressible body and an annular cavity extending into the compressible body about a wound cavity in accordance with an embodiment of the invention.

Referring now to FIG. 6, the wound cavity 14 and the annular cavity 13 are arranged so as to at least partially overlap within the compressible body 7. This arrangement places the annular cavity 13 about the wound cavity 14. In some embodiments, the wound cavity 14 may extend into the compressible body 7 so as to only partially traverse the surface layer 10. In other embodiments, the wound cavity 14 may extend into the compressible body 7 so as to completely traverse the surface layer 10 and partially traverse the subsurface layer 11. In yet other embodiments, the wound cavity 14 may extend into the compressible body 7 so as to completely traverse the surface layer 10 and the subsurface layer 11.

Referring again to FIG. 6, the annular cavity 13 may extend into the compressible body 7 so as to only partially or complete traverse the subsurface layer 11 with or without extension into the surface layer 10. While the wound cavity 14 may completely traverse the depth of the compressible body 7, it is preferred that the annular cavity 13 only partially traverse the depth of the compressible body 7. However, it is understood that it might be advantageous in some embodiments for the wound cavity 14 and the annular cavity 13 to completely traverse the depth of the compressible body 7.

Referring again to FIG. 6, the downstream end 22 of the bleed tube 9 resides within the wound box trainer 1 and extends to the wound cavity 14. This arrangement allows communication of a blood simulant from the bleed tube 9 into the wound cavity 14. The bleed tube 9 may be composed of a silicone-based resin or other material suitable for use with a blood simulant. The upstream end 23 of the bleed tube 9 may communicate with a pump (not shown) or the like to ensure continuous flow of a blood simulant into the wound cavity 14. The pump could reside within or be external to the wound box trainer 1. In preferred embodiments, the fluid pressures produced by the pump should approximate the pressures of blood within and flowing from a vascular element. This feature ensure a more realistic interaction between a blood simulant exiting the bleed tube 9 and packing materials and probes within the wound cavity 14.

The treatment of a wound typically requires both probing and packing. Probing is the process whereby a finger or an instrument is inserted into a wound cavity 14 so as to identify and remove projectile fragments and the like and to identify the source(s) of bleeds. Packing is the process whereby gauze and other materials are inserted into a wound cavity 14 so as to reduce or stem blood flow from a compromised vascular element. The present invention facilitates a realistic response by a wound structure 8 to both probing and packing by permitting movement and/or expansion of the compressible body 7 immediately adjacent to a wound cavity 14.

Referring again to FIG. 6, the wound cavity 14 and the annular cavity 13 are separated by a wall 20 comprised of a portion of the compressible body 7 between the wound cavity 14 and the annular cavity 13. The wall 20 generally defines a pocket-like structure within the simulant 6 which extends into the compressible body 7 in the direction of the bottom surface 17. While the sides of the wall 20 do not initially contact other portions of the compressible body 7 because of the annular cavity 13, the top end of the wall 20 contacts and is attached to other portions of the compressible body 7.

The wall 20 may be readily movable when probed and/or packed. This functionality permits the wall 20 to translate or rotate so that the width of the annular cavity 13 decreases in the direct of a force applied onto the wall 20 from within the wound cavity 14. This response type is typically associated with no or limited thinning of the wall 20 immediately adjacent to the movement. Preferred embodiments require the wall 20 to return and recover to its original position after a deforming force is removed.

The wall 20 may be readily expandable and contractible when probed and/or packed. This functionality permits the wall 20 to expand radially outward so that the width of the annular cavity 13 circumferentially decreases in the direct of a force applied onto the wall 20 from within the wound cavity 14. This response is typically associated with thinning of the wall 20 immediately adjacent to the expansion. The wall 20 may also contract radially inward so that the width of the annular cavity 13 circumferentially increases when a force is removed from the wall 20 within the wound cavity 14. This response is typically associated with thickening of the wall 20 immediately adjacent to the contraction. Preferred embodiments require the wall 20 to return and recover its original shape after a deforming force is removed.

In some embodiments, the wall 20 may only permit movement. In other embodiments, the wall 20 may only permit expansion. In yet embodiments, movement and expansion may be permissible. The degree to which movement and/or expansion occurs is determined in part by the thickness of the wall 20, the width of the annular cavity 13, the material(s) comprising the compressible body 7, and the forces applied to the wall 20 during probing and packing.

It is understood that the movement and/or expansion permitted by the wall 20 approximates compression of flesh, tissues, and organs adjacent to a wound cavity 14 thereby simulating movement and expansion of the interior sides along a wound cavity 14. The annular cavity 13 minimizes resistance to compression by the compressible body 7 when probed and packed by permitting a region whereby movement and/or expansion by the wall 20 occurs without initially contacting other portions of the compressible body 7 immediately adjacent to the translating or rotating portion of the wall 20. This resistance is associated with the confinement effects imposed by contact between the base 3 and the sides 21 and the bottom surface 17 along the compressible body 7.

Figure 7A:
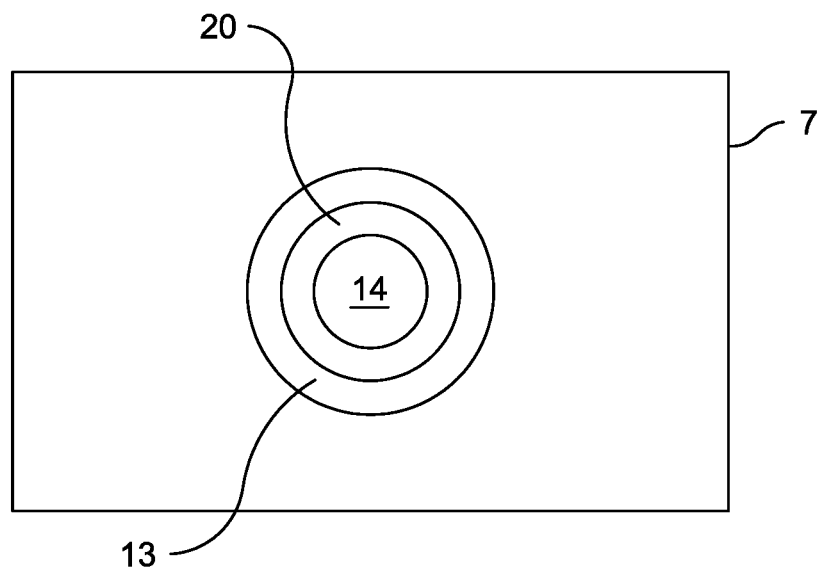
FIG. 7a is a cross-section view illustrating an annular cavity circumferentially disposed about a wound cavity without runner in accordance with an embodiment of the invention.
Figure 7B:
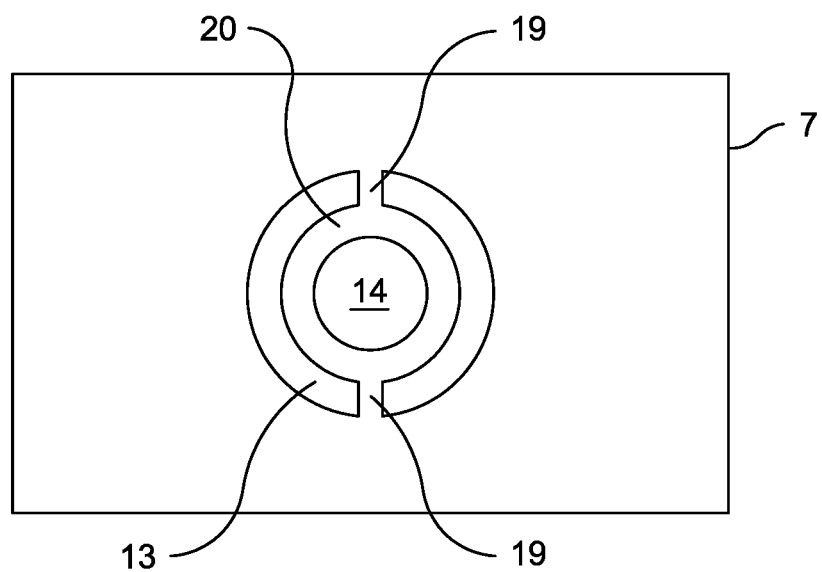
FIG. 7b is a cross-section view illustrating an annular cavity circumferentially disposed about a wound cavity with runners in accordance with an embodiment of the invention.

Referring now to FIGS. 7a and 7b, the wall 20 is composed of a portion of the compressible body 7 and generally defined by and positioned between the annular cavity 13 and the wound cavity 14. The wall 20 should be sufficiently thick so as to prevent punctures or tears that could otherwise compromise the ability of the wound cavity 14 to fill with and hold a blood simulant entering via the bleed tube 9. In some embodiments, the annular cavity 13 should completely encircle the side of the wall 20 thereby separating it from other portions of the compressible body 7 as represent in FIG. 7a. In other embodiments, the side of the wall 20 could be partially secured to a portion of the compressible body 7 via one or more runners 19 as represented in FIG. 7b. The runner 19 could be a web-like element that traverses a portion of the depth of the compressible body 7 so as to provide lateral support to the wall 20 along a portion of the circumference of the wound cavity 14. The runner(s) 19 may induce asymmetries in the movement and expansion of the wall 20 as might be imposed by flesh, tissues, bones, and the like adjacent to the wound cavity 14.

Referring again to FIGS. 1 and 6, the wound box trainer 1 is opened by separating the lid 4 from the base 3. If a hinge 5 is provided between the lid 4 and base 3, then the lid 4 is rotated up and away from the base 4. Separation of the lid 4 from the base 3 exposes the simulant 6 so that the top surface 16 is clearly visible and the wound structure 8 and bleed tube 9 are accessible. The bleed tube 9 is removed from the case 2 and extended therefrom for attachment to a pump (not shown) communicable with a reservoir or the like containing a blood simulant. The pump may be manually operable or motorized. Once engaged and powered, the pump communicates the blood simulant into the bleed tube 9. The bleed tube 9 communicates the blood simulant into the wound cavity 14 at the location wherein the bleed tube 9 enters the wound cavity 14.

The wound box trainer 1 is used as an instructional tool to demonstrate treatment techniques required to properly limit or stem blood loss from a wound structure 8 caused by a compromised vascular element. The compromised vascular element is simulated by the bleed tube 9. The wound box trainer 1 permits the trainee to practice various treatment techniques via probing and packing of the wound structure 8.

The wound box trainer 1 may include one or more wound types, examples including but not limited to, a wound structure 8 with a wound cavity 14 associated with a penetration-induced injury or a wound structure 8 associated with a blast-induced injury. Exemplary penetration-induced injuries include, but are not limited to, a wound cavity 14 produced by a bullet, a fragment, a projectile, or the like. Exemplary blast-induced injuries include, but are not limited to, a wound cavity 14 produced by explosive pressures that either directly or indirectly penetrate or tear flesh, tissues, and organs.

Figure 8:
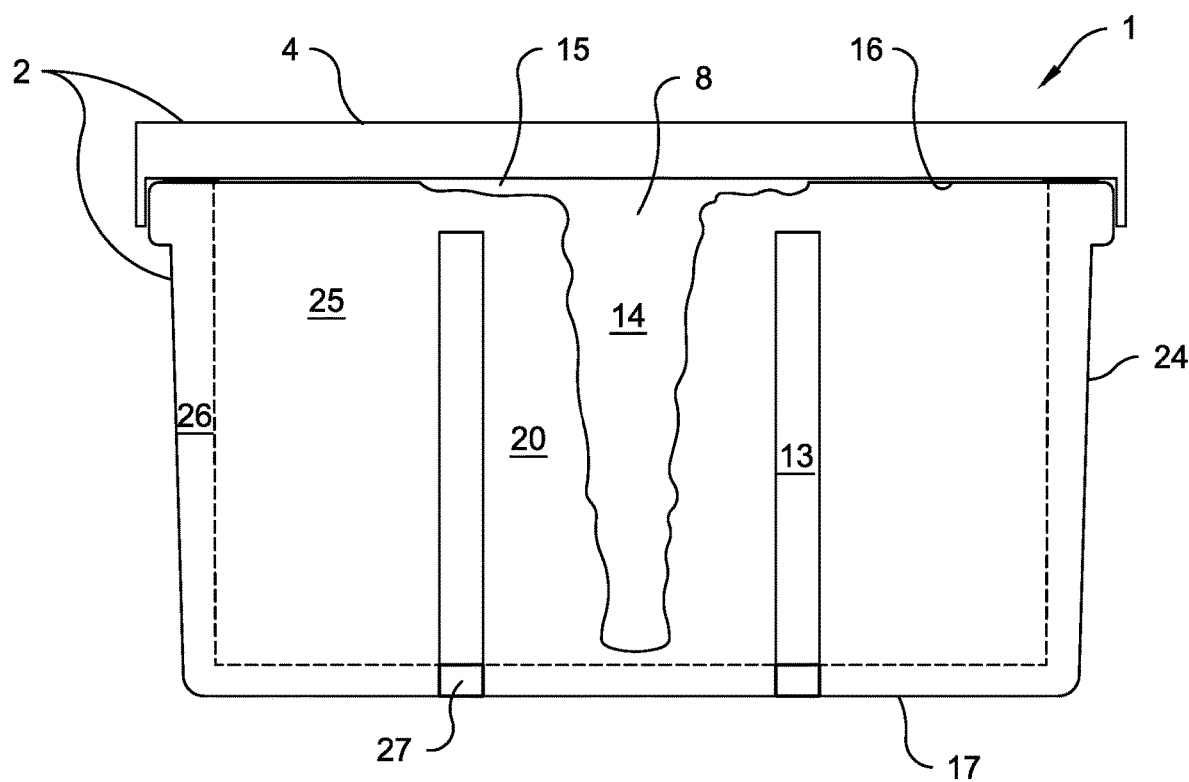
FIG. 8 is a cross-section view illustrating a wound box trainer with optional lid whereby a base is disposed about and integral to a compressible body so that both the base and the compressible body form a composite body in accordance with an embodiment of the invention.

Referring now to FIG. 8, the wound box trainer 1 may include a base 26 which is integral to and an extension of the compressible body 25. In this embodiment, the base 26 and the compressible body 25 are inseparable thereby forming a unitary body 24. Furthermore, the base 26 is more resistant to damage than the compressible body 25 so as to form a protective cover about the compressible body 25.

The unitary body 24 may be fabricated from one or more resins or the like, preferably castable, which form a base 26 providing a shell-like protective covering along the sides and the bottom of the otherwise elastically-deformable compressible body 25. When two or more resins are required to properly form the base 26 and the compressible body 25, the resins may be jointly or separately poured and cured.

The protective shell-like structure forming the base 26 is the functional equivalent of the base 3 described herein. In preferred embodiments, the base 26 is harder and therefore less prone to damage than the compressible body 25. In some embodiments, hardness may gradually decrease with depth in the direction of the compressible body 25 so that the transition between the base 26 and the compressible body 25 is less distinct than the dashed line illustrated in FIG. 8. In other embodiments, hardness may abruptly change at a particularly depth or over a narrow range of depths so that the transition between the base 26 and the compressible body 25 is more distinct as suggested by the dashed line in FIG. 8. Regardless, it is understood that the compressible body 25 and the base 26 form a unitary body 24 whereby the base 26 is disposed about the sides and the bottom of the compressible body 25 and whereby the compressible body 25 and the base 26 are not separable without damage to one or both components. It is further understood that the base 26 should form a protective covering about the compressible body 25 without compromising the compressibility of the compressible body 25.

Referring again to FIG. 8, the wound structure 8 is disposed along the compressible body 25 so that a wound cavity 14 as described herein extends into the compressible body 25 from a top surface 16. The wound cavity 14 may include an optional surface feature 15 as also described herein. The wound cavity 14 and the surface feature 15 may be fabricated via forming, machining, or other means understood in the art.

Referring again to FIG. 8, the annular cavity 13 as described herein extends into the compressible body 25 about the wound cavity 14. This arrangement allows at least a portion of the annular cavity 13 to reside next to and thereby overlap the wound cavity 14. In preferred embodiments, the annular cavity 13 extends into the compressible body 25 from the bottom surface 17 whereby the bottom surface 17 corresponds to the outer surface of the base 26 at the bottom side of the wound box trainer 1. A bleed tube 9 (not shown) may communicate with the wound cavity 14 as described herein. Furthermore, a channel 12 (not shown) configured as described herein to accept the bleed tube 9 may be disposed along a portion of the base 26 and/or the compressible body 25.

Referring again to FIG. 8, an insert 27 may be secured within the annular cavity 13 adjacent to the bottom surface 17. The insert 27 could be secured to the compressible body 25 by such non-limiting examples as an interference fit or an adhesive. The insert 27 is located within the annular cavity 13 so as to prevent material from entering the annular cavity 13 which might otherwise degrade or impede motion by or expansion of the wall 20 during use. In preferred embodiments, the insert 27 is positioned within the annular cavity 13 adjacent to the bottom surface 17.

In some embodiments, the insert 27 may be formed of a resin(s) comprising the base 26 and/or compressible body 26. The insert 27 may be formed separate from the unitary body 24 and then inserted into the annular cavity 13. The insert 27 may also be directly formed onto the unitary body 24 at the lower end of the annular cavity 13.

Referring again to FIG. 8, an optional lid 4 may be removably attachable to the unitary body 24 adjacent to the top surface 16. Features of the lid 4 and the base 26 may cooperate so that the lid 4 is mechanically securable to the unitary body 24 so as to conceal the top surface 16. The combination of the lid 4 and the base 26 may form a case 2 which is functionally equivalent of the lid 4 and the base 3 described herein. However, it is understood that various forms of the case 2 described herein may not require a lid 4 when the base 26 alone sufficiently protects the compressible body 25.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A penetration-induced injury simulant for medical training purposes comprising:
    (a) a compressible body which represents portion of a body, said compressible body includes a top surface and a bottom surface, said compressible body deforms from an original shape when a force is applied onto said compressible body and recovers said original shape after said force is removed from said compressible body; and
    (b) a wound structure disposed along said compressible body, said wound structure includes a wound cavity which extends into said compressible body from said top surface toward said bottom surface, said wound cavity represents one of a bullet wound, a fragment wound, or a projectile wound.

2. The penetration-induced injury simulant of claim 1, further comprising:
    (c) a blood simulant disposed within said wound cavity.

3. The penetration-induced injury simulant of claim 2, wherein said blood simulant interacts with a packing material within said wound cavity.

4. The penetration-induced injury simulant of claim 3, wherein said packing material is a gauze.

5. The penetration-induced injury simulant of claim 3, wherein said packing material is a bandage.

6. The penetration-induced injury simulant of claim 1, wherein said compressible body composed of at least one layer of a silicone.

7. The penetration-induced injury simulant of claim 1, wherein said compressible body includes a surface layer and a subsurface layer.

8. The penetration-induced injury simulant of claim 1, further comprising:
    (c) a bone simulant either partially or completely embedded within said compressible body.

9. The penetration-induced injury simulant of claim 1, further comprising:
    (c) a channel disposed along said compressible body, said channel adapted to receive a bleed tube.

10. The penetration-induced injury simulant of claim 1, further comprising:
    (c) a bleed tube which communicates at one end with said wound cavity.

11. The penetration-induced injury simulant of claim 1, further comprising:
    (c) a surface feature representing a damaged tissue disposed about said wound cavity at said top surface.

12. A penetration-induced injury simulant for medical training purposes comprising:
    (a) a compressible body which represents portion of a body, said compressible body includes a top surface and a bottom surface, said compressible body includes at least one layer of a silicone, said compressible body deforms from an original shape when a force is applied onto said compressible body and recovers said original shape after said force is removed from said compressible body;
    (b) a wound structure disposed along said compressible body, said wound structure includes a wound cavity which extends into said compressible body from said top surface, said wound cavity representative of one of a bullet wound, a fragment wound, or a projectile wound;
    (c) a blood simulant disposed within said wound cavity; and
    (d) a packing material disposed within said wound cavity, said blood simulant interacts with said packing material.

13. The penetration-induced injury simulant of claim 12, further comprising:
    (e) a bone simulant either partially or completely embedded within said compressible body.

14. The penetration-induced injury simulant of claim 12, further comprising:
(e) a bleed tube which communicates at one end with said wound cavity.

15. The penetration-induced injury simulant of claim 12, further comprising:
(e) a surface feature which represents a damaged tissue disposed about said wound cavity at said top surface.

16. A penetration-induced injury simulant for medical training purposes comprising:
(a) a compressible body which represents portion of a body, said compressible body includes a top surface and a bottom surface, said compressible body includes at least one layer of a silicone, said compressible body deforms from an original shape when a force is applied onto said compressible body and recovers said original shape after said force is removed from said compressible body;
(b) a wound structure disposed along said compressible body, said wound structure includes a wound cavity which extends into said compressible body from said top surface, said wound cavity representing one of a bullet wound, a fragment wound, or a projectile wound;
(c) a surface feature which represents a damaged tissue disposed about said wound cavity at said top surface; and
(d) a blood simulant disposed within said wound cavity.

17. The penetration-induced injury simulant of claim 16, further comprising:
(e) a packing material disposed within said wound cavity, said packing material interacts with said blood simulant.

18. The penetration-induced injury simulant of claim 17, wherein said packing material is a gauze.

19. The penetration-induced injury simulant of claim 17, wherein said packing material is a bandage.

20. The penetration-induced injury simulant of claim 16, further comprising:
(e) a bleed tube which communicates at one end with said wound cavity.

* * * * *